July 5, 1955 J. L. LAWSON ET AL 2,712,646

DUAL TRANSMITTER SYSTEM

Filed May 22, 1945

INVENTORS.
BRUCE B. CORK
JAMES L. LAWSON
BY
Ralph L. Chappell
ATTORNEY

United States Patent Office 2,712,646

Patented July 5, 1955

2,712,646

DUAL TRANSMITTER SYSTEM

James L. Lawson, Cambridge, Mass., and Bruce B. Cork, Peck, Mich., assignors, by mesne assignments, to the United States of America as represented by the Secretary of the Navy Application May 22, 1945, Serial No. 595,145

1 Claim. (Cl. 343—5)

This invention relates to a radio echo system which couples two or more transmitter magnetrons into a common antenna, and involves establishing adequate protection from the transmitted pulses for one or more receivers also connected to the same antenna. Previous radio echo systems have included only one transmitting magnetron which has limited the output energy of the system to one operating frequency and has likewise limited the amount of output power to that amount which could be produced by one magnetron.

It is an object of this invention to arrange in one common transmission line two magnetron oscillators each with a different transmitting frequency so that either one or the other may be operated into a single antenna. This makes possible a choice of operating frequency for the system.

It is another object of this invention to arrange in one common transmission line two magnetron oscillators each with a different transmitting frequency so that both magnetrons may be operated at the same time. This simultaneous utilization of different frequencies in the output increases the probability of receiving echoes from distant objects upon the premise that the radiation pattern from an irregular object is critically dependent upon the wave length, and further it decreases the possibility of interference which might be present on a particular frequency.

It is another object of this invention to arrange in the same transmission line two magnetron oscillators having the same or different transmitting frequencies so that both may be operated at the same time for the purpose of increasing the peak power output of the system.

It is another object of this invention to arrange in the same transmission line a plurality of magnetron oscillators having the same or different frequencies, which may be operated separately or simultaneously in order to accomplish a more extensive application of the principles of the foregoing objects with correspondingly greater effectiveness.

Other objects and features will be revealed by consideration of the followed detailed description taken with the accompanying drawings and diagrams which represent typical embodiments and are not to be construed as defining the limits of the invention. The magnetrons used in the present invention are magnetron oscillators conventionally employed in the transmitter of radio echo detection systems, and for brevity will be referred to hereinafter in the specification and claim, merely as "magnetron."

Figure 1:
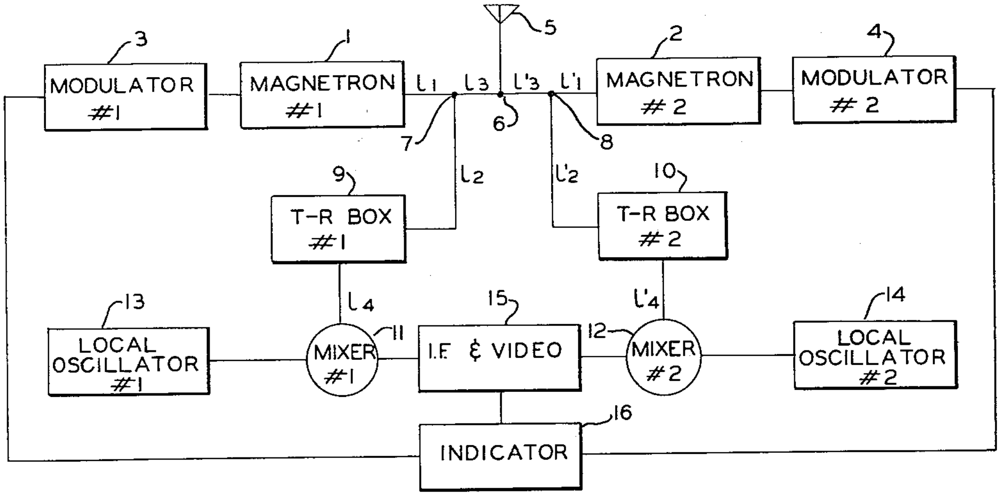
Fig. 1 is a diagram of a system exemplifying the principles of the invention in the use of two magnetrons of the same or different frequencies.

Referring to Fig. 1 which shows an earlier embodiment of the invention, there are two magnetrons 1 and 2, which may be designed to oscillate at the same wave length or at slightly differing wave lengths $\lambda_1$ and $\lambda_2$. Since the case in which they are of different frequencies is more general and the case in which both frequencies are the same may be regarded as a special case, we shall consider that magnetron 1 is designed to oscillate at $\lambda_1$, and magnetron 2 at $\lambda_2$. Modulators 3 and 4 are provided to activate the magnetrons 1 and 2 respectively. The magnetrons 1 and 2 are located at electrically critical distances from the junction point 6 of an antenna 5, magnetron 1 being at a distance $l_1+l_3$ equal to $$\frac{(2n+1)\lambda_2}{4}$$

and magnetron 2 being at a distance $l_1'+l_3'$ equal to $$\frac{(2n+1)\lambda_1}{4}$$

so that magnetron 1 presents a high impedance to magnetron 2 and magnetron 2 presents a high impedance to magnetron 1. It is desirable that frequency displacement or pulling be minimized and power transmission maximized by the proper design of the characteristic impedance of line and load. Also magnetrons having good frequency spectrums should be employed.

To assure maximum received signals the distances $l_1$ and $l_1'$ from the magnetrons 1 and 2 respectively to the junction points 7 and 8 respectively should be such that the magnetrons 1 and 2 when not activated present a high impedance at the junctions 7 and 8 respectively. The distances $l_2$ and $l_2'$ between the transmit-receive boxes 9 and 10 hereinafter referred to as T-R boxes and T-junctions 7 and 8 should be such that combined with the coupling to the T-R boxes the desired loaded Q of the T-R boxes obtains. The mixers 11 and 12 should be matched into the antenna line and distances $l_4$ and $l_4'$ between the mixers 11 and 12 and T-R boxes 9 and 10 should be such that the crystals present a high impedance at the T-R boxes during the initial pulse of transmitted energy.

Also shown in the diagram are two local oscillators 13 and 14 connected respectively into the mixers 11 and 12, the resultant output going to common I. F. and video stages 15 and then to indictaor 16, which is synchronized with the modulators 3 and 4.

Figure 2:
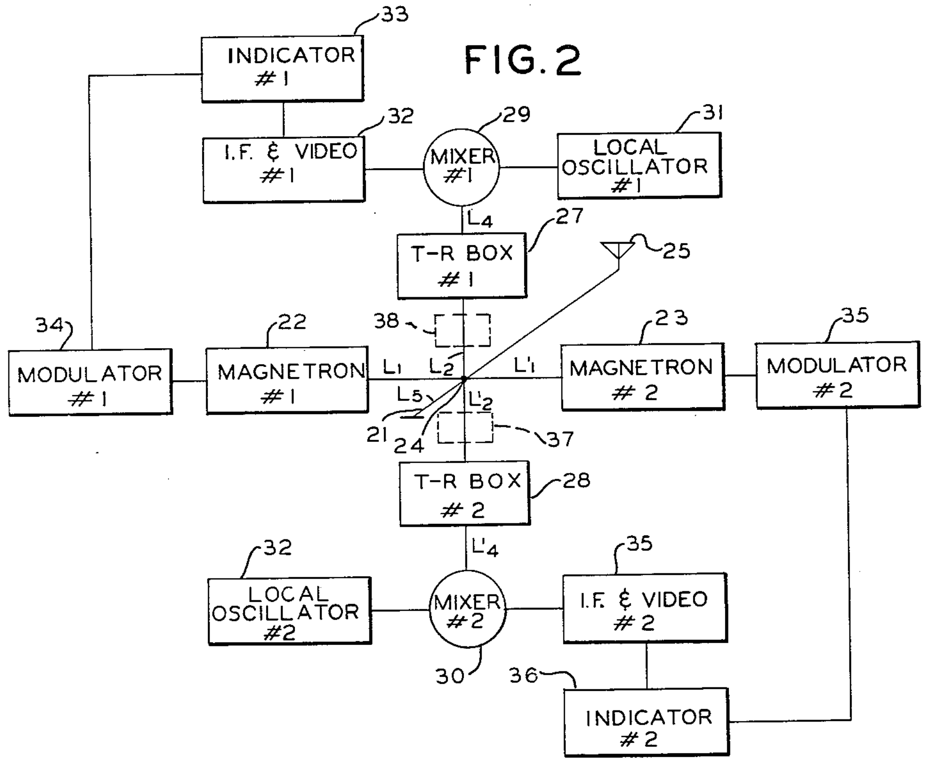
Fig. 2 is a diagram of a similar system in which practically speaking the same components as employed in Fig. 1 are utilized but are connected differently at the junction point of magnetron and receiver lines to the common antenna.

Referring to Fig. 2 which shows also a two magnetron system in accordance with the principle of the invention, it will be noted that in this embodiment the distances corresponding to distances $l_3$ and $l_3'$ of Fig. 1 have been reduced to zero and a stub support 21 of length $L_5$ has been added, and includes two receivers and two indicators instead of one common receiver and indicator.

The principles of the systems of Figs. 1 and 2 are applicable in any band of frequencies. Shown in Fig. 2 are two magnetrons 22 and 23 at distances $L_1$ and $L_1'$ respectively from a junction 24 to which an antenna 25 is connected. $L_1$ and $L_1'$ are pre-plumb lengths using a contact type coupling to the magnetrons, the distances being measured from the junction to the face of the magnetron coupling flange, and are electrically speaking $$\frac{(2n+1)\lambda}{4}$$

in length.

Also shown in the system of Fig. 2 are transmit-receive spark gap switches hereinafter referred to as T-R boxes 27 and 28 located at distances $L_2$ and $L_2'$ respectively from junction 24. These distances are the same respectively as $L_1'$ and $L_1$. Stated in general terms the lengths $L_1$ and $L_2'$ are $$\frac{n\lambda_2}{4}$$

and $L_1'$ and $L_2$ are $$\frac{n\lambda_1}{4}$$

$n$ being any odd integer.

The rest of the system illustrated by Fig. 2 includes mixers 29 and 30 into which are coupled local oscillators 31 and 32. The output of mixer 29 is fed into I. F. and video stages 32 and thence into an indicator 33 which is synchronized with modulator 34. Similarly the output of mixer 30 is fed into I. F. and video stages 35 and then into a separate indicator 36.

In either of the cases illustrated by Fig. 1 or Fig. 2, it is possible to use a single modulator rather than two. Also instead of two local oscillators, one local oscillator may be employed, operated at a frequency central between the two magnetron frequencies. As additional receiver protection it is possible to insert also as indicated in dotted outline in Fig. 2 band pass resonant filters 37 and 38 in the respective receiver lines to block magnetron energy of a frequency different from that for which the particular T-R box in the line is tuned.

Although particular embodiments of the invention have been shown, there are many possible modifications and extensions thereof and therefore the invention is not to be limited except insofar as necessitated by the prior art and the spirit of the appended claim.

What is claimed is:

A radio echo detection system comprising in combination, first and second pulse transmitters for periodically producing electromagnetic waves of lengths $\lambda_1$ and $\lambda_2$, respectively, an antenna, a first pair of transmission lines connecting said transmitters to said antenna at a common juncture, the length of the transmission lines coupling said first and second transmitters to said juncture being, respectively, $$\frac{n\lambda_2}{4}$$

and $$\frac{n\lambda_1}{4}$$

$n$ being an odd integer, first and second transmit-receive switches coupled to said juncture by a second pair of transmission lines, the length of these lines being $$\frac{n\lambda_1}{4}$$

and $$\frac{n\lambda_2}{4}$$

respectively, $n$ being an odd integer, first and second receivers each having a mixer stage and a local oscillator coupled thereto, means connecting said first and second transmit-receive switches to the mixer stage of said first and second receivers, respectively, and a single intermediate frequency amplifier coupled to said mixers.

References Cited in the file of this patent

UNITED STATES PATENTS

| | | |
|---|---|---|
| 1,988,020 | Reiber | Jan. 15, 1935 |
| 2,128,400 | Carter | Aug. 30, 1938 |
| 2,259,982 | Alexanderson | Oct. 21, 1941 |
| 2,401,717 | Wolff et al. | June 4, 1946 |
| 2,403,716 | Goldberg | July 9, 1946 |
| 2,419,564 | Keister | Apr. 29, 1947 |
| 2,422,361 | Miller | June 17, 1947 |

OTHER REFERENCES

"Radar System Fundamentals Navships 900,017," page 207, April 1944. Copy in Division 51.